April 5, 1966  D. H. RUMBLE  3,244,986
DETECTION OF BI-PHASE DIGITAL SIGNALS
Filed Oct. 8, 1962  5 Sheets-Sheet 3

United States Patent Office 3,244,986
Patented Apr. 5, 1966

3,244,986
DETECTION OF BI-PHASE DIGITAL SIGNALS
Dale H. Rumble, Carmel, N.Y., assignor to International Business Machines Corporation, New York, N.Y., a corporation of New York
Filed Oct. 8, 1962, Ser. No. 228,961
24 Claims. (Cl. 328—140)

This invention relates to detection of digital signals, and more particularly, to demodulation of bi-phase digital signals each of which is composed of a positive and a negative excursion from a datum.

In conjunction with transmission of information in digital fashion, it has been suggested that the binary-coded signals be transmitted in bi-phase form, that is, with one signal of opposite phase from the other, and with each signal or waveform having alternate positive and negative excursions from a datum. This type of transmission has several advantages, including the elimination of an average D.-C. level so that accurate detection of the signal is more readily made than with other types of digital signals.

It has been previously suggested in Clayden Patent No. 2,700,155 that bi-phase square wave signals be translated into conventional on-off signals by deriving short gating (or clock) pulses from the received waveforms and applying these pulses, with the square wave signals, to a gate during the first half of each waveform period. If a positive signal voltage is supplied to the gate at the time the gating pulse arrives, the gate output is up, indicating a binary "1," while if a zero or negative signal voltage is supplied at that time, a binary "0" is indicated. This detection technique, however, requires that a plurality of synchronizing waveforms precede each message. Moreover, no particular advantage in signal-to-noise ratio is obtained with this system.

Another prior art suggestion for detection of bi-phase signals is particularly intended to increase signal-to-noise ratio by correlation of the respective halves of the received waveforms with each other. In this scheme, as suggested by Warnock Patent No. 3,008,124, the received signals are delayed by one-half waveform period, either the delayed or the received waveforms are inverted and the two resultant waveforms are added together. However, this prior art detection method also requires transmission of a synchronizing signal prior to the bi-phase information signal, and involves control by the synchronizing signal of a clock source at the receiver. The clock source is then employed to provide gating pulses which gate the resultant waveform through respective positive and negative selection circuits.

The present invention has for its principal purpose the detection of bi-phase signals of the type referred to above without the requirement for any clock source at the receiver, but with an improvement in signal-to-noise ratio, especially in a gaussian noise environment. In fact, the present invention employs a threshold detection scheme which inhibits detection in the first half cycle of the received waveform, so that detection can only occur in the second half cycle. This inhibiting function is preferably achieved through generation of a degating voltage having a duration and form such that no excess of the received waveform over the threshold level is effective to provide a digit indication until after the waveform has decreased to a level below the threshold in the half waveform period following that in which an indication occurs.

More specifically, the invention includes the provision of an indication of one digit whenever the correlation between the two half cycles of a waveform results in a total exceeding a threshold of one polarity, providing an indication of another digit whenever such correlation provides a total exceeding a threshold of another polarity, and inhibiting any such indication for a time interval between about ¾ of a waveform period and one waveform period after an indication occurs. Since the first half waveform received will not be correlated, and a degree of uncertainty may result with respect thereto, and further since it is necessary with the invention to make certain that the detection process locks on to the proper half waveform, it is preferable in operation of the invention that the received waveform include a predetermined digit as its first transmission, whenever any information is being transmitted. If such is the case, the indication of another digit may be inhibited until such first digit is indicated, and thereafter a proper synchronization will occur.

It was indicated above that the present invention does not require the use of a separate clock, or synchronizing source. In fact, the degating or inhibition function provided for by the invention performs the function of a synchronizing clock, but, unlike other known systems it is not at all essential with this invention that the transmission frequency remain constant. All that is essential is that the waveform periods be of constant length and that each message be preceded by a known digit. Then, the digits may be transmitted in random fashion, as in bursts of two or more, and it is not necessary that they be transmitted continuously.

The invention will now be described in conjunction with a binary digital system in which a positive half cycle of a sine wave, followed by a negative half cycle, indicates a "1" while a negative half cycle followed by a positive half cycle indicates a "0." Nevertheless, the sine waveform is not at all essential to the invention and in fact other known bi-phase waveforms, such as a skew-symmetric or a pulse waveform, may be employed.

Further, while the invention as described above employs correlation of the two half cycles of each received waveform, it will also be apparent from the following description of the invention that correlation with adjacent waveforms is also contemplated. Further, the invention includes the indication and possible correction of errors resultant from improper detection.

The invention will also be described in conjunction particularly with a digital transmission system by which, for instance, meter indications or the like may be transmitted to a distant location for recordation and control. However, the invention also may be used in conjunction with other digital-transferring apparatus, as, for instance, computers. More specifically, it has been suggested in the prior art that bi-phase waveforms derived from reproduction of a magnetically recorded signal be detected by the inversion and delay technique forming one part of the present invention. It will be apparent from the detailed description of the invention that the feature by which correlation is restricted to a particular half cycle of the received waveform may be utilized in such magnetic recording reproduction. Other applications of the invention to non-transmission systems will be apparent to those of skill in the digital information-transferring art.

The foregoing and other objects, features and advantages of the invention will be apparent from the following more particular description of preferred embodiments of the invention, as illustrated in the accompanying drawings.

Figure 1:
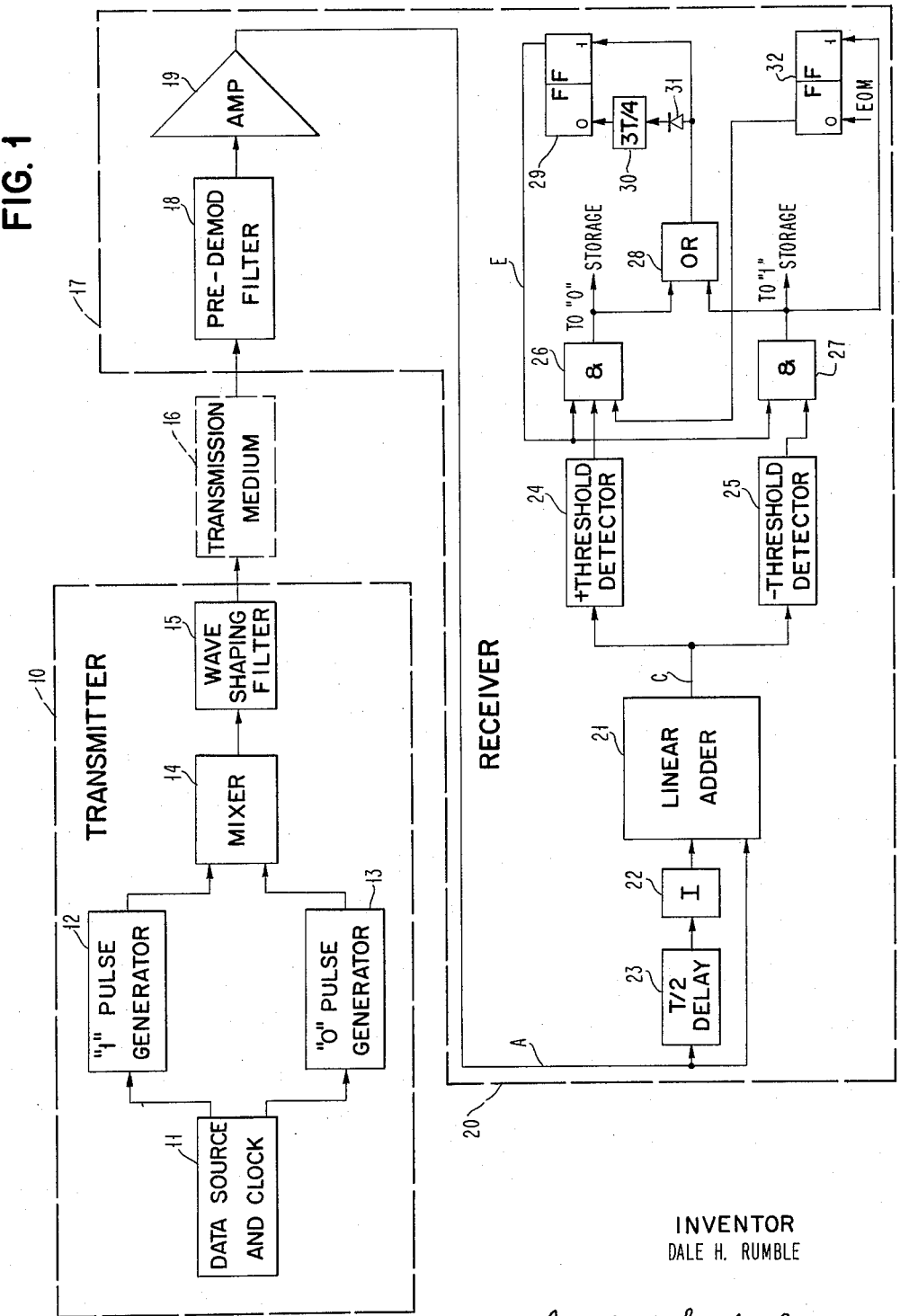
FIG. 1 is a block representation of a digital transmission system including one embodiment of the invention.

Referring first to FIG. 1, though the source of the waveforms to be demodulated by the method and apparatus of the invention is not at all important to the invention, a system including such a source will be described to provide a setting for the explanation of the features of the invention itself. A suitable source of waveforms to be operated on by the invention may include a transmitter generally shown at 10 and including a data or information source and a clock or synchronizing source, generally indicated at 11. The output of the source and clock 11 may be employed to control pulse generators for the binary "1" and binary "0" waveforms, respectively shown at 12 and 13. The outputs of the pulse generators are supplied to a mixer 14 whose output in turn may appropriately be provided to a wave shaping filter 15. The filter is particularly desirable if the output of the mixer 14 is to be changed in some fashion, as from a pulse to sine wave shape, or from sine wave shape to skew-symmetric form.

The output of the transmitter consists of waveforms each of which includes a positive and a negative excursion from a datum, with the waveforms of opposite phase for binary "1's" and "0's." The transmitter output may then be transmitted through an appropriate transmission medium 16, such as a land line or a microwave radio system. As has been indicated, neither the transmitter nor the transmission medium is essential to operation of the invention, so long as the waveforms supplied to the receiver 17 each contain both positive and negative excursions from the datum in different half cycles with opposite phase waveforms representing different digits.

The receiver 17 may appropriately include a pre-demodulator filter 18 to remove as much noise as possible and to reconstruct the original transmitted waveform to the extent possible and desirable. The output of the filter 18 can then be amplified by a suitable amplifier 19 before being supplied to the demodulator.

The demodulation function of the invention is performed by apparatus generally shown at 20 including a linear adder 21 of suitable well-known construction such as to provide an output equal to the sum of its inputs. One input to the adder 21 is the output of the amplifier 19, while the other input is shown as the output of an inverter 22 of appropriate well-known construction. The inverter 22 obtains its input from the amplifier 19 through a suitable delay apparatus 23 providing a delay of ½ of the waveform period of the digits. The delay apparatus 23 may, for instance, be a delay line, or any other well-known type of apparatus constructed to provide a precisely determined delay between its input and its output.

Figure 2:
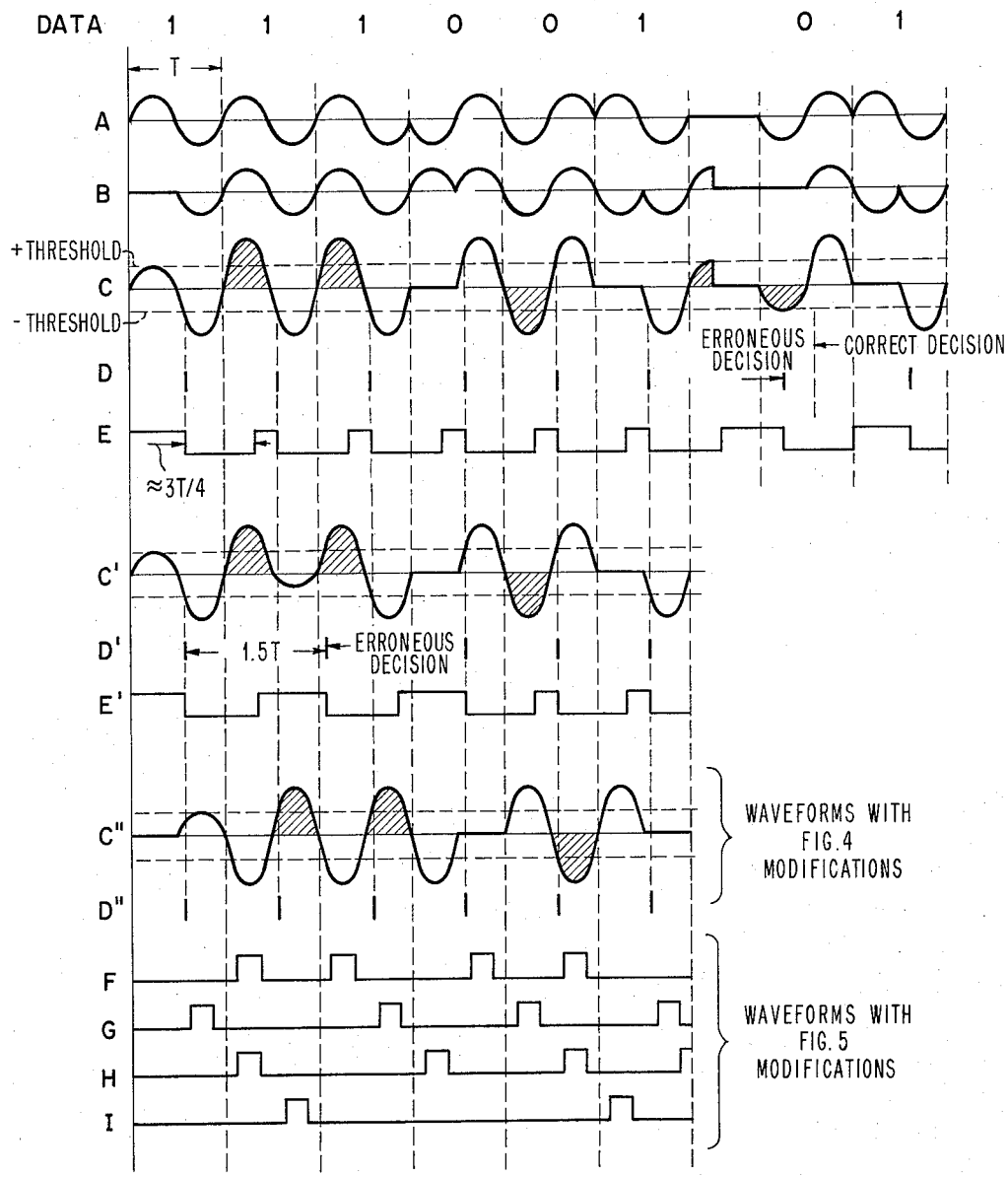
FIG. 2 is a simplified showing of certain waveforms appearing at various points in operation of the apparatus of FIG. 1 and subsequent modifications thereof.

The operation of the apparatus of FIG. 1 may be better understood by examination of waveforms at various places in the apparatus, such as shown in FIG. 2. The output of the amplifier 19 of FIG. 1 is shown at "A" in FIG. 2 for one example of a train of digits that might be received by the receiver. In this example the following series of digits is represented: 1 1 1 0 0 1. It will be recognized that the waveforms are shown as highly idealized, and that they will normally be distorted by noise, particularly if the waveforms are conducted through a transmission medium.

The output of the inverter 22 is shown at "B" in FIG. 2 and consists merely of the waveforms A inverted and delayed by one-half of a waveform period. The sum of the two waveforms A and B is provided by the linear adder 21 and is shown at "C" in FIG. 2. From examination of that representation, it will be seen that the two waveforms A and B reinforce each other in certain halves of the waveform periods, while they oppose each other in others. For instance, the peak amplitude of the waveform C in the second half of the first cycle is twice the peak amplitude of the output of the amplifier 19, shown at A, during the same half cycle. At the same time, gaussian noise is equally likely to add or subtract improving the $s/n$ ratio.

The functions of the linear adder 21 and the inverter 22 may both be performed by a transistor amplifier to whose first stage both the delayed and the undelayed waveforms are supplied, the former to the base and the latter to the emitter.

Referring again to FIG. 1, the output of the linear adder 21 is supplied to a pair of threshold detectors 24 and 25. The first threshold detector is indicated as responsive only to positive polarity amplitudes exceeding the threshold, while the second detector is responsive only to negative polarity amplitudes exceeding its threshold. The threshold detectors may be of any appropriate well-known type, such as a vacuum tube or transistor amplifier biased to cut off at any level below a selected threshold. Further, the threshold detectors desirably contain controls for the cut-off levels, such as potentiometers connected across a suitable bias source and variable to change the threshold level. For a purpose to be explained hereinafter, the threshold detectors may also be designed in accordance with well-known slope detection techniques so as to respond only to waveforms of increasing voltage (respectively, in the positive and negative senses).

In FIG. 2 the positive and negative threshold levels are shown as equal to the peak amplitudes of the original waveform A received from the amplifier 19. It will be apparent that it is not essential that this particular threshold be selected, and indeed it may be desirable to increase or decrease it during use of the apparatus, depending upon the average amplitude available from amplifier 19 and the level of noise contamination of the received signal. The threshold levels, are however, desirably fixed at about the peak amplitudes of the original waveforms, so that the maximum increase in signal-to-noise ratio provided by the invention may be utilized.

Whenever either threshold detector receives a voltage which exceeds its preset threshold (direction of change may also be incorporated if desired), that detector supplies an output voltage which is directed to a suitable logical AND 26 and 27, respectively. The outputs of the AND's 26 and 27 respectively represent the binary "0" and the binary "1" and may be directed to other suitable apparatus, such as storage registers. The two outputs are also supplied together to a logical OR 28 which provides a pulse whenever either threshold detector supplies an output voltage during the second half of each received waveform. The restriction of this detection to the second half of the received waveform is achieved through use of an inhibition technique performed by a degating bistable flip flop 29. That flip flop may be of any suitable well-known type such that its "1" output drops from a high level to a low level when a pulse is received by its "1" input, and its "1" output increases from the low level to a high level when its "0" input receives a pulse. The "1" input of the flop flop 29 is supplied directly by the OR 28, while the "0" input is supplied by that OR through a delay apparatus 30 which provides a delay of (as shown) ¾ of a waveform period. In order to insure that the flip flop 29 may not have its "0" input triggered by the wrong polarity pulse, a diode rectifier 31 may be connected between the OR 28 and the delay apparatus 30.

The "1" output of the flip flop 29 is connected to both of the AND's 26 and 27 and functions to inhibit passage of the output of the respective threshold detector through the AND whenever the voltage at the "1" input decreases below a selected level.

Referring to FIG. 2, it will be seen that the waveform "C" has in its first half cycle a half sine wave of voltage which has a peak level equal to the positive threshold. Since it is not desirable that detection occur at this time and it cannot be assured that the amplitude will be either less or greater than the threshold level during this first half cycle, a further part of the inhibiting function is provided by a second degating flip flop 32. That flip flop receives its "1" input from the AND 27 and supplies its "0" output to the AND 26. The function of the "0" input to the flip flop 32 will be explained hereafter but suffice it to say at this time that the "0" output is at a suitable low level at the time the first waveform is received, so that the AND 26 is inhibited from providing a pulse indicating a binary "0."

The apparatus of FIG. 1 is designed to operate only on waveforms received with the first binary digit a binary "1" for reasons that will be explained hereinafter.

In operation of the apparatus of FIG. 1, referring to FIG. 2 it will be seen that the waveform C exceeds the negative threshold during the second half cycle of the received waveform. Since the binary "1" has been assumed in this embodiment of the invention to consist of a positive excursion followed by a negative excursion, and since the condition that each message be preceded by a binary "1" is therefore fulfilled, the output of the AND 27 at this time should indicate a binary "1." It will do so because, as shown by the waveform E in FIG. 2, the "1" output of the flip flop 29 is at a high level at this time, and the negative threshold detector indicates that its threshold has been exceeded. The waveform "D" indicates detection of the binary "1" during the second half cycle of the first received waveform.

The OR 28 also supplies an input to the flip flop 29 to trigger the flip flop to its opposite state wherein the voltage E decreases to a suitable low level. Any detection by either of the threshold detectors 24 and 25 is therefore inhibited until the flip flop 29 is triggered back to its original state. The time length of this inhibition or degating period is selected by the delay apparatus 30 and is indicated in the illustrative embodiment as ¾ of a waveform period. (As indicated above, slope detection may be employed in the threshold detectors 24 and 25, such that the detectors will not respond to decreasing voltages, even though above their threshold levels. If such technique is used, the delay time or degating period is most desirably set at ¾ of a waveform period. If slope detection is not employed and the detectors respond to any voltage exceeding their threshold levels, the degating period is most desirably a full waveform period. However, the degating time may be set at any level between these limits depending on that time period found most useful with the particular apparatus used and conditions obtaining.)

Once the degating time has expired, the "0" input of the flip flop 29 receives a triggering voltage which reverses the conduction state of the flip flop and causes increase of the voltage E back to its original level. This change occurs at a time such as to prevent detection of a received bit during the first half of the next waveform, but to permit such detection in the second half cycle of that waveform.

It will be seen from a comparison of waveforms C and E in FIG. 2 that the former will have decreased to a level below the positive threshold by the time the degating voltage has increased back to its upper level. Therefore, detection of a bit in the first half cycle of the second waveform period is not possible. When the level of the waveform C has again increased in the negative direction beyond the negative threshold, a bit is once more indicated. This process continues through the first three bits, but as indicated by waveform A the fourth bit is a "0." A binary "0" is indicated in waveform A as a negative excursion followed by a positive excursion. The waveform C is therefore at zero voltage during the first half cycle of this fourth waveform period, but in the second half cycle, the first and second half cycles of the waveform period add together to exceed the positive threshold. An output is therefore obtained from the threshold detector 24 and is gated through the AND 26, since the "1" output of the flip flop 29 is up at this time. A "0" is therefore indicated, and the flip flop is triggered to its opposite condition, as in case of detection of a "1."

The operation of the apparatus of FIG. 1 to perform the detections or decisions indicated by the rest of the exemplary message will be obvious. However, in order to show the importance of having a "1" form the first one of a burst of bits (where bursts may include any number down to two bits, with the first being the "1" bit), a "0" and a "1" are indicated as following the last "1" bit of the continuous message in waveform A of FIG. 2, the delay between the bursts being indicated as ¾ of a waveform period. It will be seen from comparison of waveform C and waveform E for this new burst that the first half cycle of the new burst may either exceed or not exceed the negative threshold level. Since the degating voltage is up at this time, detection of the negative excursion in this half cycle would result in indication of a "1," an erroneous decision. Moreover, the degating voltage would then be triggered to its lower state, thus preventing detection of the excess over the positive threshold in the next half cycle. However, with the "1" following the "0," a correct decision would be made in the second half cycle of the second bit, so that the apparatus would be back in synchronism.

The degating or inhibition function of the flip flop 32 may be implemented by a suitable logic circuit (not shown) which provides an EOM (end-of-message) gate voltage whenever bit detections are separated by more than a suitable time period, as one-half a waveform period. That pulse may be supplied to the "0" input of flip flop 32 to reduce the "0" output thereof to a level such that AND 26 will not pass a "0" pulse.

While it has been indicated as being very important that each group of bits have as their first bits a "1" bit, it will be evident that the apparatus of FIG. 1 could be modified to permit the first bit to be a "0." Further, it will also be evident that it may not be essential in all cases that this condition be fulfilled, particularly where it is not essential that a very high level of accuracy be obtained.

Another possibility of error in operation of the apparatus of FIG. 1 in making the various decisions indicated, is illustrated by the waveforms C', D' and E' of FIG. 2. It will be noted that the waveform C' does not exceed the negative threshold level in the second half cycle of the second received bit. This may well happen, for instance, in a noisy transmission channel, if the noise subtracts from the second half waveform and is of appropriate amplitude and phase to prevent waveform C from reaching the threshold level. In such case, of course no decision would result during that half cycle, and the degating voltage would not be triggered to its lower level, so that in the first half cycle of the following bit, detection of an excess over the positive threshold level would be passed through the AND 26, and a "0" bit would be indicated. This of course would be in error, since a "1" bit was transmitted at this time and, if a series of "1"

bits followed in succession, all these bits would be indicated erroneously. This condition would result from the degating apparatus locking onto the wrong half cycle of the received waveform. As is further indicated from FIG. 1, a change in the type of bit being transmitted will eliminate this incorrect synchronization. For instance, if a "0" bit is transmitted in the fourth waveform period, as indicated in FIG. 2, no excess of a threshold level will be experienced in the first half period of this fourth waveform, an excess will be experienced in the second half of the fourth waveform, and the degating apparatus will then lock onto the appropriate half cycle once again.

Figure 3:
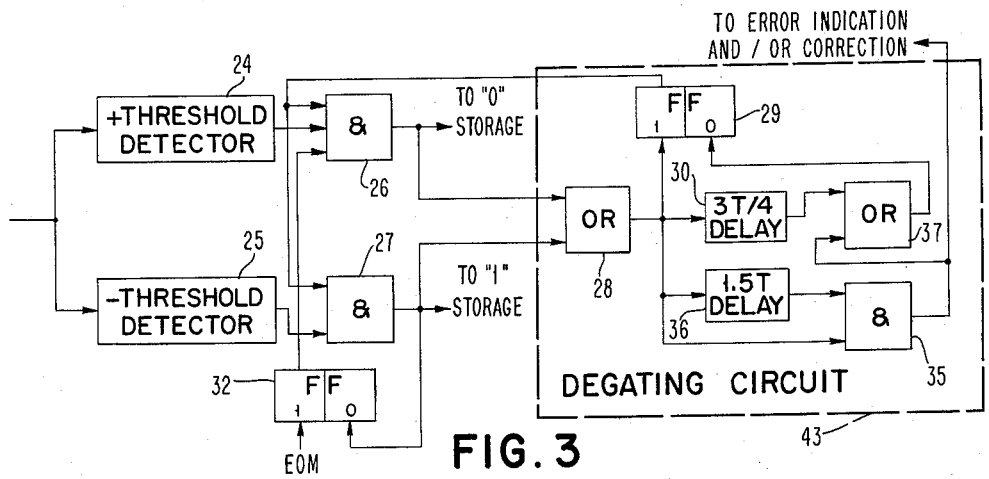
FIG. 3 is a block diagram showing a modification of the apparatus of FIG. 1 designed particularly to indicate certain errors possible with that apparatus, and to prevent locking on to the wrong half waveform of the received information.

If it is particularly important that erroneous decisions of the type indicated in waveforms C' through E' be avoided, the modification of the apparatus of FIG. 3 may be employed. The design of that apparatus is based on the fact that the first erroneous decision follows from the last correct decision by 1½ waveform periods. In reliance upon this fact, the apparatus of FIG. 3 includes a logical AND 35 one of whose inputs is obtained directly from the output of OR 28 and the other of whose inputs is obtained from that output through a 1½ waveform period delay apparatus 36. The AND 35 will therefore supply an output only when a decision is indicated 1½ waveform periods after the previous decision. The output of the AND 35 may then be used to indicate the error and may also be used to correct that error, for instance in the storage register. Further, in order to prevent the degating apparatus from locking onto the wrong half cycle of the received waveforms, the output of the AND 35 is supplied to the "0" input of the flip flop 29 through a logical OR 37. The OR 37 is also connected to the output of the ¾ waveform period delay apparatus 30, so that either the output of AND 35 or the output of this delay apparatus will reset the degating flip-flop 29. Thus, the erroneous decision indicated on waveform D' of FIG. 2 may be corrected and the proper decision indicated in the second half of that waveform.

It will be evident from a consideration of the waveform C of FIG. 2 that there is a false or imaginary pulse or half cycle between each two half cycles on which decisions are made, if those two half cycles are of the same polarity. That is, if a "1" bit follows a "1" bit, as in the illustrated first two waveform periods, there will be a positive half cycle in the half period between the two negative half cycles. Reliance can be placed upon this fact to further insure the proper detection of a received bit, even in a very noisy condition, or previous decisions can be verified thereby. The apparatus of FIG. 4 is employed for this purpose and operates to render a decision based upon these imaginary or noise half cycles, as well as upon the true half cycles.

In that apparatus the output of the linear adder 21 is not only supplied to the threshold detectors 24' and 25', but is also supplied to an additional set of positive and negative threshold detectors 38 and 39, respectively. Such supply is through a ½ waveform period delay apparatus 40. The output of negative threshold detector 39 is then combined with the output of positive threshold detector 29 in logical OR 41 while the output of positive threshold detector 38 is combined with the output of negative threshold detector 25' in logical OR 42. The outputs of the two OR's may then be supplied to a degating circuit 43 of the same type as shown in FIG. 3. As indicated also in FIG. 4, it is not essential that the AND function be performed by separate logical AND's, since the threshold detectors can be of appropriate design such that their thresholds can never be exceeded unless the voltage output of the degating circuit is up. This degating voltage may then be supplied to each of the four threshold detectors of FIG. 4.

Figure 4:
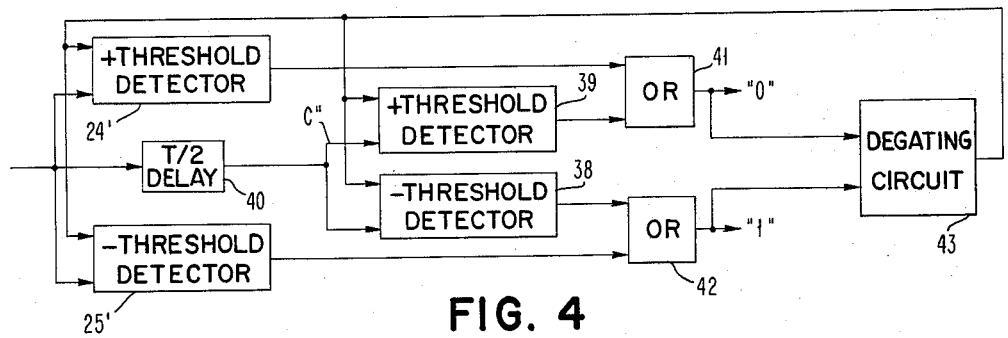
FIG. 4 is a block diagram showing of a further modification of the invention showing the use of a prediction technique which employs the first half cycle of the correlated waveform to predict decisions that will be made in the next half cycle.

For explanation of the operation of the apparatus of FIG. 4 the waveform C' of FIG. 2 may be compared with the waveform C" which represents the output of the delay apparatus 40. Making the same assumption as made in conjunction with waveform C', that is, that the second half cycle of the second waveform period does not exceed the negative threshold level, no decision would be made at this time based only on that waveform. However, the excess over the positive threshold level in the previous half cycle indicates that this second bit is the same as the first bit. It will be noted that the waveform C" exceeds the positive threshold level at the same time that the waveform C' should exceed the negative threshold level. The positive threshold detector 38 therefore furnishes an output to OR 42, indicating a "1" in this waveform slot. It will also be evident that the waveform C' will not permit the erroneous decision indicated by the waveform D', with the apparatus of FIG. 4, since the degating voltage will prevent indication of a "0" in this time period. However, it will also be apparent that this prediction technique illustrated in conjunction with FIG. 4 is not useful when there is a change in bits. That is, when the waveform A changes from a "1" to a "0" or from a "0" to a "1," the voltage in the first half waveform period is zero and cannot be used as indicated in FIG. 4 for prediction purposes. The use of this zero amplitude half cycle for prediction will, however, be discussed further in conjunction with FIG. 6.

Figure 5:
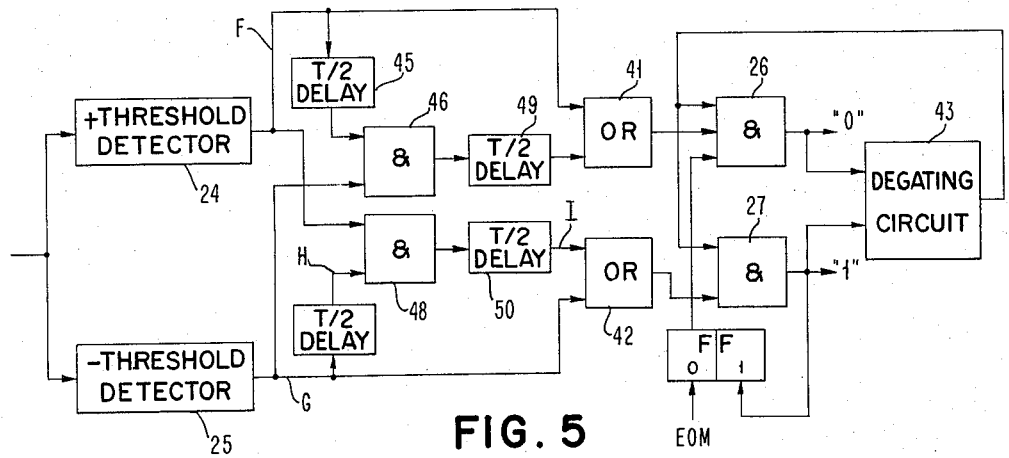
FIG. 5 is a block diagram representation of a modification of the apparatus of FIG. 4 designed to obtain the same function.

Turning now to FIG. 5, however, an alternative system for accomplishing the function of the apparatus of FIG. 4 will be described. In that apparatus no secondary threshold detectors, such as those shown at 38 and 39 in FIG. 4, are employed. Rather, the output of positive threshold detector 24 is supplied both to the OR 41 and, through a half waveform period delay apparatus 45, to a logical AND 46. This AND is also supplied with the output of the negative threshold detector 25, so that the AND will supply an output only when the negative threshold is exceeded ½ cycle after the positive threshold detector is exceeded.

Similarly, the output of negative threshold detector 25 is supplied through a ½ waveform period delay apparatus 47 to a logical AND 48. The other input to AND 48 is obtained from the positive threshold detector 24. Thus, AND 48 will provide an output only when the positive threshold is exceeded ½ waveform period after the negative threshold is exceeded.

The outputs of AND's 46 and 48 are supplied to OR's 41 and 42, respectively, through ½ waveform period delay apparatus 49 and 50. These delays are provided so that the decisions provided by this prediction technique will be made in the second half of each waveform cycle, as occurs normally with the technique of correlation between the first and second halves of each cycle.

The remaining apparatus of FIG. 5 is similar to that of FIG. 3, so that it need not be further described.

Operation of the apparatus of FIG. 5 is shown by waveforms "F–I" in FIG. 2 and consideration of those waveforms will indicate the use of the prediction technique in manner similar to that obtained with the apparatus of FIG. 4.

Figure 6:
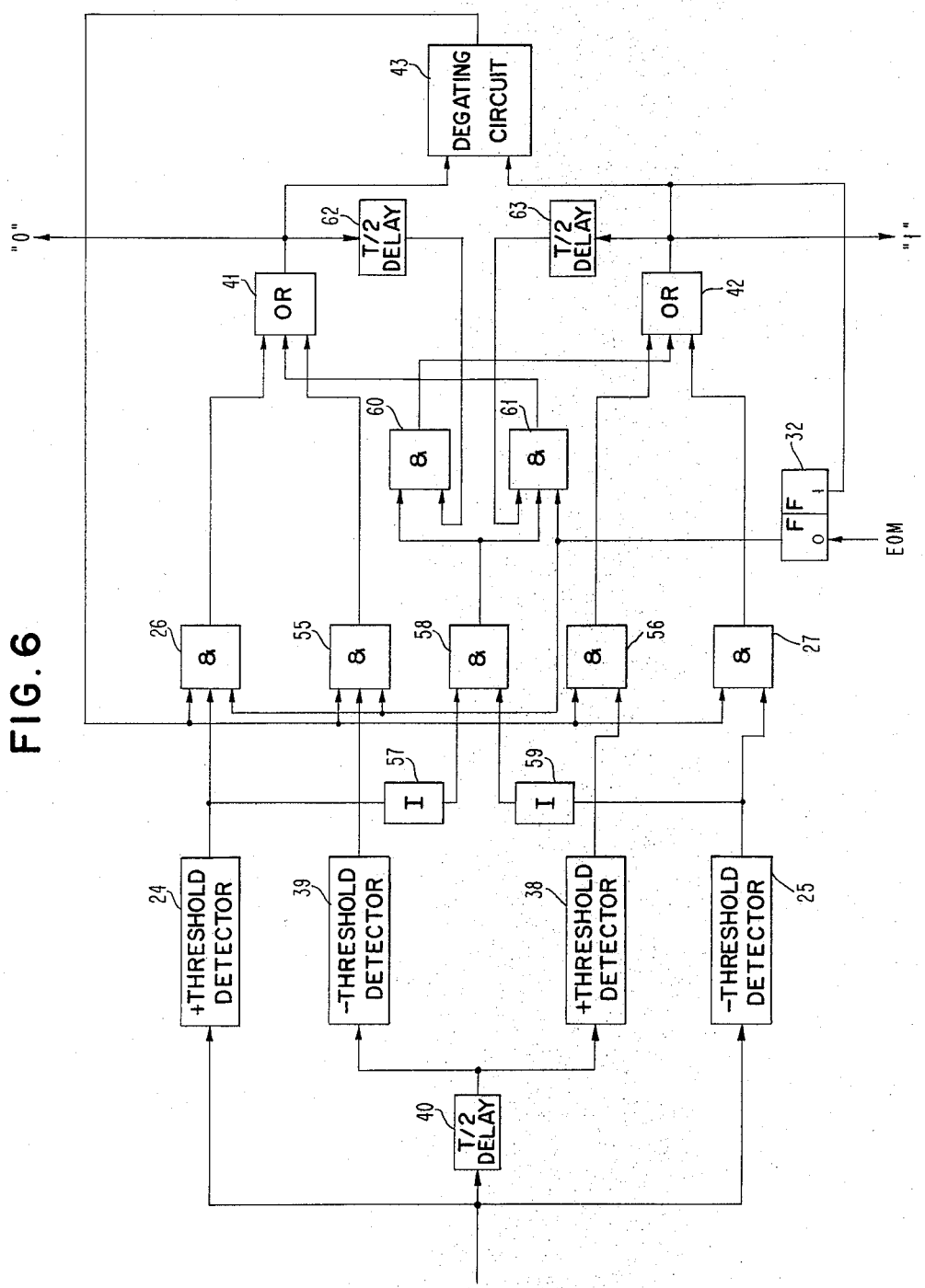
FIG. 6 is a block diagram showing a modification of the apparatus of FIG. 4 designed to perform a further prediction function.

Referring now to FIG. 6, as was indicated above, the absence of excess over both the positive and negative thresholds may be used to predict the change of a bit. That is, if the imaginary pulse is zero and the previous bit was a "1," the next bit is a "0." In like fashion, if the last bit was a "0" and the imaginary pulse is zero (at least less than either of the thresholds) the next bit must be a "1."

The apparatus of FIG. 6 constitutes essentially an addition to the apparatus of FIG. 4 to perform this additional prediction function. However, the degating function is shown in FIG. 6 as operated from the threshold detection function, as was used in the apparatus of FIGS. 1 and 3. In FIG. 6 the threshold detector 39 is shown as connected to a logical AND 55, rather than directly to the OR 41. In like fashion, the output of threshold detector 39 is shown connected to a logical AND 56, rather than directly to OR 42. The outputs of these two AND's are respectively connected to the OR's 41 and 42, while others of their inputs are obtained from the degating circuit 43 and, in the case of AND 55, the flip flop 32. Additionally, the output of threshold detector 24 is supplied through an inverter 57 to a logical AND 58. The output of negative threshold detector 25 is similarly supplied through an inverter 59 to the AND 58. The output of AND 58 will be up only when neither the positive or negative threshold detectors provides an output. The output of AND 58 is supplied to each of a pair of logical AND's 60 and 61. The other inputs to these AND's are obtained from OR's 41 and 42, respectively, through ½ waveform period delay apparatus 62 and 63. The outputs of AND's 60 and 61 are respectively supplied to the OR's 42 and 41.

In operation of the apparatus of FIG. 6 when a "0" is indicated by the output of OR 41, and the threshold of neither detectors 24 and 25 is exceeded ½ waveform period later, the output of AND 60 will be up and a voltage will be supplied to OR 42 to cause it to indicate a "1." Similarly, when OR 42 indicates a "1" and neither threshold detector supplies an output voltage ½ waveform period later, the AND 61 will supply a voltage to OR 41 to cause it to indicate a "0."

In place of the prediction technique illustrated by the apparatus shown in FIGS. 4–6, a secondary correlation may be performed. It will be remembered that the first or primary correlation is performed by adding together in additive sense the first and second half waveform periods of the received waveform. This secondary correlation is obtained in the apparatus of FIG. 7 by adding to the total provided by the first or primary correlation that same total inverted and delayed by ½ waveform period. It will be noted from a consideration of the waveforms of FIG. 8 that this actually involves use of the imaginary pulses occurring in the first half waveform periods.

Figure 7:
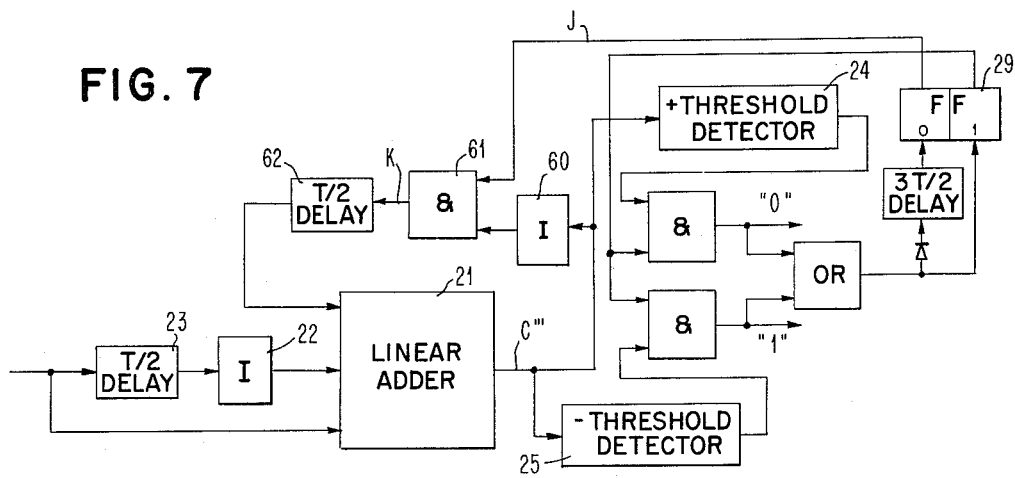
FIG. 7 is a block diagram representation of a further modification of the invention designed to obtain an improvement in signal-to-noise ratio over that obtained with the other modifications; and, FIG. 8 is a simplified showing of certain waveforms appearing at various points in operation of the apparatus of FIG. 7.
Figure 8:
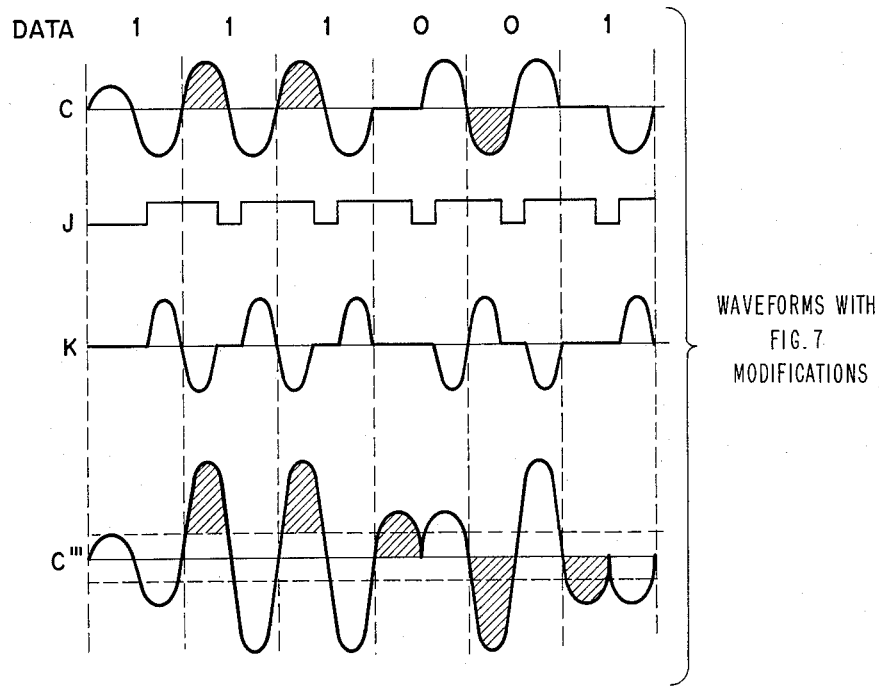

The apparatus of FIG. 7 actually constitutes a modification of the apparatus of FIG. 1 in which the output of the linear adder 21 is not only supplied to the positive and negative threshold detectors 24 and 25, respectively, but also to an inverter 60. The output of this inverter is supplied to a logical AND 61, along with the "0" output of degating flip flop 29. This "0" output is of course exactly the opposite of the "1" output so that it is up only during the degated period. As a result, AND 61 supplies an output "K" which is inverted from the waveform C, and only during the degating time. That output is supplied through a ½ waveform period delay apparatus 62 to the linear adder 21, thus resulting in the total output of the linear adder appearing as a waveform C''' in FIG. 8. It will be noted from a consideration of that waveform that the voltages supplied to the threshold detectors 24 and 25 are twice the amplitudes of the voltages illustrated by the waveform C, whenever there is an imaginary pulse between two true pulses (that is, whenever two successive bits are the same). Consequently, the signal-to-noise level during at least a part of the message is doubled even over the normal doubling provided by the primary correlation technique. As a result of this increase in amplitude of the voltages supplied to the threshold detectors, it is possible to set the threshold levels higher than indicated in the drawings, thus increasing the likelihood that a correct decision will be reached, although decreasing the signal-to-noise ratio. The increase in signal-to-noise ratio provided by either the primary, or both the primary and secondary correlation techniques, of the invention is a characteristic of extreme advantage with this invention. As a result of this advantage it is possible to operate in a relatively noisy transmission medium at much higher speed than would normally be expected, as compared with the actual bandwidth of the transmission medium.

Though the invention has been described in conjunction with embodiments designed particularly for a binary digit system, it will be evident that higher order alphabets can also be employed with advantage in the invention. Further, while the invention has been particularly shown and described with reference to preferred embodiments thereof, it will be understood by those skilled in the art that the foregoing and other changes in form and details may be made therein without departing from the spirit and scope of the invention.

What is claimed is:

1. In a system for transferring digital information from one apparatus to another wherein each digit is represented by both positive and negative excursions from a datum in different half waveform periods and different digits are represented by opposite phase waveforms, such waveform periods being of constant length, the method of demodulating such waveforms including the steps of
    correlating the first and second halves of each waveform by adding them together in the same sense,
    providing an indication of one digit whenever such correlation provides a total exceeding a predetermined threshold of one polarity and indication of another digit whenever such correlation provides a total exceeding a predetermined threshold of another polarity, with respect to a datum,
    and inhibiting both such indications for a time interval after each such indication sufficient that the total resultant from such correlation has decreased to a level below the threshold in the half waveform period following that in which the indication occurred.

2. The method of claim 1 in which such inhibition interval is between about three-quarters of a waveform period and one waveform period.

3. The method of claim 2 in which said correlating step is performed by delaying the waveforms by one half of a waveform period, inverting one of the delayed waveforms and the undelayed waveforms, and adding the resultant waveforms together.

4. The method of claim 3 wherein the information is transferred in binary form with one bit represented by a positive excursion followed by a negative excursion and the other bit represented by a negative excursion followed by a positive excursion, the delayed waveforms are the ones inverted, and said one polarity is negative and said other polarity positive, said thresholds being set approximately equal to the amplitudes of such excursions before correlation.

5. The method of claim 4 wherein each group of bits separated by more than one half waveform period from a previous group has as its first bit a preselected one of such bits, and including the step of inhibiting indication of the other one of such bits until after said preselected bit is indicated.

6. The method of claim 1 further including the step of providing an indication of error whenever an indication of a digit is followed one and one half waveform periods later by an indication of a digit.

7. The method of claim 6 further including the step of eliminating such inhibition whenever such error is indicated.

8. In a system for transferring digital information from one apparatus to another wherein one bit is represented by a positive excursion followed by a negative excursion from a datum and another bit is represented by a negative excursion followed by a positive excursion from a datum, in different half waveform periods, such waveform periods being a constant length, the method of demodulating such waveforms including the steps of
    correlating the first and second halves of each waveform by delaying the received waveforms by one-half waveform period, inverting one of the delayed and undelayed waveforms and adding the resultant waveforms together,
    providing an indication of said one bit whenever such correlation provides a total during the second half of any waveform period exceeding a predetermined threshold of one polarity when the delayed waveforms are inverted and of the opposite polarity when the undelayed waveforms are inverted.

9. The method of claim 8 further including the step of providing an indication of the same bit in the second half of the immediately following waveform period whenever such correlation provides a total during the first half of such period exceeding the opposite polarity threshold to the polarity exceeded in the second half of the immediately preceding waveform period.

10. The method of claim 8 including the step of inhibiting any such indication during the first half of each waveform period.

11. The method of claim 9 in which said inhibiting step comprises inhibiting any such indication during the first half of the first received waveform and additionally inhibiting any such indication for an interval of between about three-quarters of one waveform period and one waveform period after any such indication.

12. The method of claim 8 further including the step of providing an indication of a different one of said one and said other bits in the second half of the immediately following waveform period whenever such correlation exceeds neither of said thresholds during the first half of such period.

13. The method of claim 8 further including the step of further correlating adjacent waveforms by adding to the total provided by said first-mentioned correlating step the inverted and delayed total thereof, said delay being for one-half a waveform period.

14. In a system for transferring digital information from one apparatus to another wherein one bit is represented by a positive excursion followed by a negative excursion from a datum and another bit is represented by a negative excursion followed by a positive excursion from a datum, in different half waveform periods, with such periods of constant length, a demodulator for such waveforms comprising first means for delaying the received waveforms by one-half of a waveform period to form a delayed output, second means for inverting one of said delayed output and the received waveforms and adding the resultant to said received waveforms to form a composite voltage wave, third means including a pair of threshold detectors responsive to opposite polarity voltages exceeding a predetermined threshold value to deliver an output when not inhibited therefrom, said composite wave being supplied to each of said threshold detectors, and fourth means connected to the outputs of said third means operable upon receipt of an input therefrom to inhibit said third means from delivering an output for an interval of approximately three-quarters to one waveform period thereafter.

15. The apparatus of claim 14 in which said fourth means includes a bistable flip flop having one input supplied with the output of each of said threshold detectors, and delay means operable to delay the output of each threshold detector for said interval, the output of said delay means being connected to the other input of said flip flop, the output of the flip flop corresponding to said one input being connected to said third means.

16. The apparatus of claim 15 in which said third means includes a logical AND for each threshold detector having one of its inputs connected to the output of that threshold detector, another input of each AND being connected to said one output of the flip flop, the output of each of said AND's being connected to said one input of the flip flop and to said delay means.

17. The apparatus of claim 15 including a logical AND having its output connected to said other input of the flip flop, one input of said AND being supplied with the output of each of said threshold detectors, and second delay means operable to delay the outputs of said third means by about one and one-half waveform periods, the output of said second delay means being connected to the input of said AND.

18. The apparatus of claim 14 further including fifth means connected to said third means and operable to supply an error signal whenever an output of said third means follows a preceding output by one and one-half waveform periods.

19. The apparatus of claim 14 further including fifth means including a second pair of threshold detectors responsive to opposite polarity voltages exceeding said predetermined threshold value to deliver an output when not inhibited therefrom, sixth means for delaying said composite wave by one-half waveform period and supplying the so delayed wave to each of said second pair of threshold detectors, a first one of a logical AND and a logical OR having inputs connected to the output of the positive threshold detector of said first-mentioned pair and the output of the negative threshold detector of said second pair, a second one of a logical AND and a logical OR having inputs connected to the output of the negative threshold detector of said first-mentioned pair and the output of the positive threshold detector of said second pair, the outputs of said first and second ones of a logical AND and a logical OR being connected to said fourth means and said fourth means also being operable to inhibit said fifth means from delivering an output for an interval of approximately three-quarters to one waveform period thereafter.

20. The apparatus of claim 19 in which each of said first and second ones of a logical OR and a logical AND is a logical OR, and further including seventh means connected to each of said logical OR's and operable to supply an error signal whenever an output of either OR follows a preceding output by one and one-half waveform periods.

21. The apparatus of claim 20 in which said seventh means is connected to said fourth means and is operable to terminate said inhibition interval whenever said seventh means supplies an error signal.

22. The apparatus of claim 14 further including fifth means connected between the output and input of said second means operable to invert said composite voltage and delay it by one-half waveform period so that the output of said fifth means may be added into said composite voltage.

23. The apparatus of claim 22 in which said second means includes an inverter and a linear adder and the output of said fifth means is connected to said linear adder.

24. The apparatus of claim 23 in which said fifth means includes a second inverter, a logical AND and a one-half waveform delay apparatus connected in that order between the output and input of said linear adder, said fourth means being connected to said AND to supply a voltage thereto only during said inhibition interval.

References Cited by the Examiner

UNITED STATES PATENTS

| | | | |
|---|---|---|---|
| 2,716,189 | 8/1955 | Ayres | 329—128 X |
| 3,032,745 | 5/1962 | Hamer | 340—170 |
| 3,082,377 | 3/1963 | Filipowsky | 329—104 X |

ARTHUR GAUSS, *Primary Examiner*

D. D. FORRER, *Assistant Examiner.*